United States Patent
Wolff et al.

(10) Patent No.: US 7,605,100 B2
(45) Date of Patent: Oct. 20, 2009

(54) LEAD AND ARSENIC FREE OPTICAL HARD CROWN GLASSES

(75) Inventors: Silke Wolff, Hueckeswagen (DE); Stefanie Hansen, Gensingen (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 566 days.

(21) Appl. No.: 11/346,961

(22) Filed: Feb. 3, 2006

(65) Prior Publication Data

US 2007/0054795 A1    Mar. 8, 2007

(30) Foreign Application Priority Data

Feb. 9, 2005    (DE)    ........................ 10 2005 005 994

(51) Int. Cl.
    C03C 3/093    (2006.01)
    C03C 3/091    (2006.01)
    C03C 3/066    (2006.01)

(52) U.S. Cl. ............... 501/67; 501/66; 501/79

(58) Field of Classification Search ............ 501/66, 501/67, 69
    See application file for complete search history.

(56) References Cited

U.S. PATENT DOCUMENTS

| 5,744,409 | A | 4/1998 | Hashimoto et al. |
| 5,919,718 | A | 7/1999 | Hirota et al. |
| 6,703,333 | B2 | 3/2004 | Uehara |
| 2004/0116268 | A1 | 6/2004 | Kobayashi et al. |

FOREIGN PATENT DOCUMENTS

| GB | 2 233 781 | 1/1991 |
| JP | 63170247 | 7/1988 |
| JP | 05017176 | 1/1993 |
| JP | 06107425 | 4/1994 |
| JP | 08012368 | 1/1996 |
| WO | 02/096818 | 12/2002 |

OTHER PUBLICATIONS

Derwent Abstract 1994-163743, English Abstract of JP 6-107425, Apr. 19, 1994.*
Christian Hofmann et al: "Optical Materials" Optical Glasses, Ulmann's Encyclopedia of Industrial Chemistry, Jun. 15, 2000 (in English).

* cited by examiner

*Primary Examiner*—Karl E Group
*Assistant Examiner*—Elizabeth A Bolden
(74) *Attorney, Agent, or Firm*—Michael J. Striker

(57) ABSTRACT

The present invention relates to lead and arsenic free optical hard crown glasses with a low transformation temperature ($Tg \leq 520°$ C.), characterized by their optical range with a refractive index of $1.57 \leq n_d \leq 1.61$ and an Abbe number of $56 \leq v_d \leq 63$.

The glasses have the following composition (in wt %):

| | |
|---|---|
| $SiO_2$ | 37-46 |
| $B_2O_3$ | 12-18 |
| $Al_2O_3$ | 1-7 |
| $Li_2O$ | 5.5-<7 |
| $Na_2O$ | 1-5 |
| $K_2O$ | <4 |
| MgO | <5 |
| CaO | <7 |
| BaO | 21-29 |
| SrO | 0.1-1.5 |
| ZnO | 1-4.5 |
| $TiO_2$ | 0.1-0.5 |
| $ZrO_2$ | <0.7 | with $\Sigma\ TiO_2, ZrO_2 < 0.9$.

Refiners can be added, provided that they do not comprise arsenic.

4 Claims, No Drawings

LEAD AND ARSENIC FREE OPTICAL HARD CROWN GLASSES

CROSS-REFERENCE

The invention described and claimed herein below is also described in German Patent Application 10 2005 005 994.5, filed on Feb. 9, 2005 in Germany. The aforesaid German Patent Application provides the basis for a claim of priority of invention for the invention claimed described and herein below under 35 U.S.C. 119 (a) to (d).

BACKGROUND OF THE INVENTION

1. The Field of the Invention

The present invention relates to lead and arsenic free optical hard crown glasses with a low transformation temperature (Tg≦520° C.), characterized by their optical range with a refractive index of $1.57 \leq n_d \leq 1.61$ and an Abbe number of $56 \leq v_d \leq 63$.

2. The Description of the Related Art

In the recent years the tendency of the market in the field of optical technologies as well as opto-electronic technologies (application areas mapping, projection, telecommunication, optical communication engineering, optical data processing and laser technology) goes more and more into the direction of miniaturization. This is observable with the finished products and therefore appears also with single structural members and components. For the producers of optical glasses, this means first of all a clear decrease of the demanded volumes in spite of increased quantities of products.

Furthermore, there is an increasing pricing pressure on the side of the re-processors, because more waste noticeably accumulates with clearly lower sizes of the components made of block/ingot glass procentually related to the product and in addition the processing of such miniature parts causes a highly increased operating expense.

For that reasons, the re-processors' requests for blank pressed small components and also for their preliminary stages, namely for preforms close to the final geometry for repressing, the so-called "precision gobs" or, shortly, "gobs", increase. These precision gobs are completely fire-polished, free or half-free formed glass portions, the production of which is imaginable by various ways.

One production method for gobs is the beaded spray procedure. In this connection no selective portioning is necessary, and the remaining fraction doesn't have to be wasted after the separation of the specific size fraction (e.g. sieving), but can be recycled as highly pure and particularly well re-melting cullets. Furthermore large numbers of parts are realized within a short period of time using that procedure, which is technically and personally very easy to handle.

In contrast to that, direct pressing of parts close to the final geometry, which has to be judged as being more laborious and more difficult, raises the problem of profitability. This procedure can comply with the smaller volumes of melted glass (distributed on a high number of small parts of material) in a flexible way by shorter set-up times but with the small geometries the creation of value cannot be caused by the value of the material alone because of the smaller number of parts per time unit compared with the "gob spraying". Rather, the products should leave the press in a state ready for installation, without laborious post-processing, cooling and/or cold re-processing. Because of the required high accuracy of geometries, precision instruments with high grade and therefore expensive mold materials must be used. The lifetimes of the molds massively affect the profitability of the products/materials.

A very important point concerning lifetimes is the working temperature, which conforms with the viscosity of the materials to be pressed. This means for glass as a material, that the profitability and therefore the earnings increase the lower the transformation temperature (Tg) of the glass is. Thus, there is a demand for so-called "low-Tg-glasses", i.e. glasses with a low transformation temperature, which also means low melting temperatures and low temperatures at the corresponding viscosity points during processing.

Further, from a process technological point of view, the melting behaviour of the glasses is of some importance, because there is a growing demand for so-called "short" glasses.

The viscosity of those glasses changes strongly with the temperature. An ideal behaviour concerning the change of viscosity in dependence on the temperature is of that kind, that a glass is indeed clearly "shorter" (which means a stronger change of viscosity in dependence on the temperature) than e.g. classic BK7, but not so extremely "short" like the glasses of the family of lanthanum borate glasses. An optimised behaviour of that kind has the advantage in the process, that the times of hot forming, i.e. the closure times of the mold, can be decreased because of the adjusted behaviour of the glass. Because of that, the throughput (reducing of the cycle times) can be increased and further the material of the mold is conserved at the same time, which has clearly a positive effect on the costs of the whole production.

Another aspect is, that glasses with adjusted behavior concerning the viscosity in dependence on the temperature can also be cooled faster, which offers the possibility of processing glasses with a higher tendency for crystallization without prenucleation, which could cause problems in succeeding steps of secondary hot forming. This aspect results in the fact, that suitable glasses are not only suitable for the producing of "gobs" and for direct pressing, but further also for the fibre production, which the corresponding glasses have in common with lanthanum borate glasses.

The prior art describes glasses, which all have immense disadvantages:

JP 63170247 A describes glasses with a gradient of the refractive index. The mentioned contents of alkali oxides are responsible for a strong widening of the intrinsically stable network structure and therefore for a large mobility of the single components. This is volitional and is used specifically for the purpose of quick and effective ion exchange. The mobility of the nucleating and crystallizing agents conclusively rises with the mobility of the fluxing agent, which leads to an enhancement of the tendency of nucleation in a primary process of hot forming as well as to an enhanced crystal growth in a secondary process of hot forming. Properties like that are not desired and can be avoided by defined low contents of the two main nucleating agents of that system, $TiO_2$ and $ZrO_2$, but which is not suggested by that document of the prior art. Rather, for example the content of $TiO_2$ can be up to 32 wt %. Further there is no hint in JP 63170247 A, that arsenic oxide or lead oxide should be avoided in the glasses. The use of zinc oxide as a component is not suggested.

GB 2 233 781A describes ophtalmic glasses with low Abbe numbers of 40 to 54. Again, high contents of the main nucleating agents $TiO_2$ und $ZrO_2$ (total amount 5.7-33.8 wt %) are used, which is accompanied by massive disadvantages by the previously mentioned reasons (keyword: crystallization). Further, that document of the prior art discloses glass compositions with high amounts of alkali oxides, namely at least 30 wt %, which again leads to the mentioned disadvantages, namely, that the mobility of all components rises so far, that the tendency of crystallization is drastically increased.

JP 05017176 A also describes glasses with low Abbe numbers ($v_d$ 30-55). Those numbers are achieved as well by the use of up to 20 wt % $TiO_2$ and $ZrO_2$, which leads to the known disadvantages.

The same can be said for the glasses, which are disclosed in JP 06107425 A. Their Abbe number is at most 27. Again, the content of $TiO_2$ and $ZrO_2$ can be in total up to 40 wt %, which leads to undesired tendency of crystallization.

JP 08012368 A describes potentially lead containing glasses (PbO<5 wt %) for pressing. The use of Lithium oxide in the glasses is obligatory in high amounts from 7 to 12 wt %, which gives even more disadvantages to the material: first of all, $Li_2O$, as an extremely potent fluxing agent, strongly increases the mobility of the glass components with the consequence, that nucleation and crystallization are favored. Then, the use of $Li_2O$ in combination with $B_2O_3$ (5-30 wt %) leads to an increased damage of crucibles, which has a strong and undesired transmission decreasing effect in the case of platinum aggregates.

The glasses, that are disclosed in U.S. Pat. No. 5,744,409 and contain also $Li_2O$ contents between 7 and 12 wt %, show comparable disadvantages. Further those glasses can contain up to 5 wt % PbO, which is undesired from an ecological point of view.

WO 02/96818 A1 describes crystallized glass with an unfavorably high content of nucleating agents ($TiO_2$+$ZrO_2$ up to 28 wt %) and alkali oxides (up to 84 wt % with $K_2O$>3.7 wt %), which leads to a homogeneous and numerous nucleation and crystallization as a basis for homogeneous material. But the crystallization is not desired in the areas of the above mentioned applications.

SUMMARY OF THE INVENTION

It is the object of the present invention is to provide glasses, which are preferably suitable for use in the above described technologies and can be processed in an economical way and therefore show defined, advantageous properties. More precisely, glasses for the application areas mapping, projection, telecommunication, optical communication engineering and/or laser technology with a defined refractive index ($1.57 \leq n_d \leq 1.61$), a defined Abbe number ($56 \leq v_d \leq 63$) and a low transformation temperature ($Tg \leq 520°$ C.) are to be provided, which are further easily meltable and processable. In addition, those glasses are to have a sufficient stability against crystallization, which enables a continuing processing. Particularly, the glasses are to have a defined behavior of viscosity in dependence on the temperature (low transformation temperature), are to have defined optical properties concerning $n_d$ und $v_d$, do not contain PbO und $As_2O_3$, which are undesired from an ecological point of view.

This problem is solved by glasses described in the claims. The glasses according to this invention are lead and arsenic free glasses with good chemical durability and stability against crystallization, having a refractive index ($n_d$) of higher than or equal to 1.57 and lower than or equal to 1.61 (between 1.57 and 1.61), an Abbe number ($v_d$) of higher than or equal to 56 and lower than or equal to 63 (between 56 and 63) and a transformation temperature (Tg) of lower than or equal to 520° C., with the following composition (in wt %):

| | |
|---|---|
| $SiO_2$ | 37-46 |
| $B_2O_3$ | 12-18 |
| $Al_2O_3$ | 1-7 |
| $Li_2O$ | 5.5-<7 |
| $Na_2O$ | 1-5 |
| $K_2O$ | <4 |
| MgO | <5 |
| CaO | <7 |
| BaO | 21-29 |
| SrO | 0.1-1.5 |
| ZnO | 1-4.5 |
| $TiO_2$ | 0.1-0.5 |
| $ZrO_2$ | <0.7 | with $\Sigma TiO_2, ZrO_2 < 0.9$.

Preferably, the refractive indices of the glasses are between 1.58 and 1.60, more preferably between 1.585 and 1.590. Preferred values of the Abbe numbers are between 57 and 62 and more preferred between 58 and 61.

The glasses according to the present invention with defined adjusted vicosity behavior in dependence on the temperature allow a better controllability (standard platin equipment, moderate filling times for the molds etc.) in the area of hot forming (HFG—"Heiβformgebung") and therefore an increased process homogenity, which leads to a further increase of the yields and, as a consequence, advances the efficiency of the resulting products. From a technical point of view, such a "moderate shortness" could be described roughly and under neglect of all further side conditions by the possibility to use a platinum feeder diameter of about 5 to 10 mm.

The glasses according to the present invention and known optical glasses of similar glass families have the optical data in common. But the former ones are featured by good meltability, flexible processability close to the final geometry, low production costs by reduced process costs, the sufficient stability against crystallization due to their shortness, as well as good environmental compatibility.

In addition, they can also contain usual refiners in low contents with exception of arsenic containing refiners.

The glasses of the present invention fulfill the requirement of good meltability and processability, with a refractive index of $1.57 \leq n_d \leq 1.61$, an Abbe number of $56 \leq v_d \leq 63$ and low transformation temperature ($Tg \leq 520°$ C.) as well as of good producability, processability and stability against crystallization, at the same time connected with lack of PbO and $As_2O_3$.

The basic glass system is leaned on the boro-aluminosilicate system, which intrinsically is a good basis for the desired properties.

The borate content acts besides its glass forming properties also as a fluxing agent, which lowers the Tg and the whole viscosity curve, respectively. Therefore, the borate content (12-18 wt %, preferably 14-16 wt %) is part of the amount of the glass formers ($SiO_2$, $B_2O_3$, $Al_2O_3$) as well as part of the amount of the fluxing agents ($B_2O_3$, $Li_2O$, $Na_2O$, $K_2O$).

However, with a further increase of the $B_2O_3$ content the network building properties would be predominating and the viscosity lowering effect would disappear. If the content would fall below that described herein, the absolute state of the viscosity with regard on the temperature will become inacceptably high for economic further hot processing close to the final geometry.

The main glass builder is silicate (37-46 wt %, preferably 40-44 wt %, more preferably 41-43 wt %). Lower contents, particularly with regard on the borate content, would lower the stability of the network and therefore the chemical resistance of the glasses as well as their stability against crystallization. Higher contents than those described herein would result in worse melting properties of the material. Further, systems with a high content of silicate often show a flat dependence of the viscosity on the temperature, and are therefore "long" glasses.

The glasses of the present invention show an obligatory content of aluminate, $Al_2O_3$ from 1-7 wt %, preferably 3-6 wt % and more preferably from 3.56 wt %. This leads to the desired steeper viscosity curve, particularly in the temperature area of further hot processing. In addition, the chemical resistance is increased.

A high total content of glass formers ($SiO_2$, $B_2O_3$ and $Al_2O_3$) guarantees a very good stability against crystallization. The content is 50-71 wt %, preferably 50-68 wt %, more preferably 57-66 wt %, most preferably 58.5-65 wt The amount of fluxing agents ($B_2O_3+M_2O$) enables well melting "LowTg" glasses, which show the desired viscosity-temperature behavior (very "short" in the lower temperature area, e.g. in the area suitable for pressing, and moderate behavior in the area of hot forming) by an addition of alkaline earth material. The amount of fluxing agents ($B_2O_3+M_2O$) is for instance 18.5-<34 wt %, preferably 18.5-30 wt %, more preferably 21.5-<27 wt % and most preferably 21.5-26.5 wt % and serves also for the optimization of the melting behavior. An amount, which is too low, would lead to a worse melting behavior, an amount, which is too high, would lead to an undesired decrease of the refractive index, but also to a destabilisation of the network, which would result in a worse stability against crystallization and chemical resistance.

The amount of pure alkali oxides in the glasses of the present invention is preferably lower than 12 wt %, more preferably lower than 11 wt % and most preferably lower than 10.5 wt %.

$Li_2O$, which has a particular strong lowering effect on the viscosity because of its special position in the homologous series, is used obligatorily with 5.5-<7 wt % (preferably 5.5-6.5 wt %). For the fine adjustment of the absolute viscosity stage and of the refractive index $Na_2O$ is used obligatorily with 1-5 wt % (preferably 2-4 wt %) and $K_2O$ optionally with <4 wt % (preferably <3 wt %). Most preferable embodiments of the invention are free of potassium oxide.

The high BaO content (21-29 wt %, preferably 23-27 wt %), which is necessary in order to achieve the optical range and "shortness" in the lower temperature area, and the preferably high content of alkali earth oxides (MO=MgO, CaO, BaO, SrO) of 21.1-<42.5 wt %, more preferably 21.1-<31 wt %, even more preferably 23.1-28 wt %, and most preferably 23.2-28 wt % for the flexible regulation of the vicosity-temperature behavior in the area of further hot processing is enabled by the very good stability against crystallization of the 3-glass-formers basis system.

The components BaO (21-29 wt %, preferably 23-27 wt %) and SrO (0.1-1.5 wt %, preferably 0.1-1 wt % and more preferably 0.3-1 wt %) are the main factors for the adjustment of the optical range (refractive index and dispersion). The rather small amount of SrO serves, besides $TiO_2$, for the flexible fine adjustment.

BaO is also responsible for the desired steepness of the viscosity-temperature behavior in the area of further hot processing. For the fine adjustment, BaO can be optionally and partly replaced by MgO (up to 5 wt %) and CaO (up to 7 wt %). Higher contents lead to an inacceptable flattening of the viscosity-temperature profile.

ZnO, used with 1-4.5 wt %, preferably 2-4.5 wt %, more preferably 2.5-4 wt %, causes regulating properties with regard to the "shortness" of the glasses. If the ZnO content was reduced below the content of the present invention, the regulating properties would not be sufficient any longer, an increase would lead to an undesired shifting of the optical range.

$TiO_2$ (0.1-0.5 wt %) and the optional $ZrO_2$ (maximum <0.7 wt %, preferable embodiments are free of $ZrO_2$) serve for the fine adjustment of the optical range, particularly with regard on the dispersion (Abbe number). The amount of both components is to be lower than 0.9 wt %, because otherwise the desired homogeneous meltability would be worse besides a too strong shifting to higher dispersion.

EXAMPLES

The invention is further described on the basis of the following embodiments, which are not to be considered as limiting:

Example 1

The glasses according to the present invention can be produced as follows: The raw materials for the oxides, preferably carbonates, nitrates and/or fluorides are weighed out, one or more refiners, e.g. $Sb_2O_3$, are added and well mixed afterwards. The glass mixture is melted at about 1250° C. into a discontinuous melting aggregate, afterwards refined (1270° C.) and homogenized. The glass can be casted at a casting temperature of about 1000° C. and processed to the desired dimensions. In the continuous aggregate of high volume the temperatures can be decreased by about 100° C. according to experience and the material can be processed at about 700° C. by direct pressing close to final geometries.

| Oxide | Wt. % | Raw material | Weight (kg) |
|---|---|---|---|
| $SiO_2$ | 42.0 | $SiO_2$ | 42.059 |
| $B_2O_3$ | 15.0 | $B_2O_3$ | 15.228 |
| $Al_2O_3$ | 4.0 | AlO(OH) | 5.155 |
| $Li_2O$ | 6.0 | $Li_2CO_3$ | 14.925 |
| $Na_2O$ | 4.0 | $Na_2CO_3$ | 6.834 |
| BaO | 24.0 | $BaCO_3$ | 31.128 |
| SrO | 0.7 | $Sr(NO_3)_2$ | 1.451 |
| ZnO | 3.5 | ZnO | 3.503 |
| $TiO_2$ | 0.5 | $TiO_2$ | 0.505 |
| $Sb_2O_3$ | 0.3 | $Sb_2O_3$ | 0.301 |
| Sum | 100.3 | | 121.089 |

The properties of the obtained glass can be found in Table 2, column 4.

The transmission data are to be considered as lower limits of the achievable values in standard production aggregates because of the worse surface-volume relation in the experimental aggragate (increased platinum impact).

With regard on the optical range, small shiftings ($\Delta nd\sim2*10^{-3}$; $\Delta vd\sim0,2$ with factor 5 in the volume) are also to be considered because of varying evaporating effects (i.a. of boron trioxide).

Example 2

Table 2 below describes 10 glass compositions and their properties (melting examples). The compositions can be produced by a process according to Example 1.

As a remark regarding the production, the following is to be mentioned: In the continuous aggregate of high volume the temperatures can be decreased by about 100° C. according to experience and the material can be processed at about 650° C. by direct pressing close to final geometries.

TABLE 2

(Examples 1-5, melting examples (in wt %))

| | Example | | | | |
|---|---|---|---|---|---|
| | 1 | 2 | 3 | 4 | 5 |
| $SiO_2$ | 40 | 44 | 41 | 42 | 43 |
| $B_2O_3$ | 16 | 14 | 16 | 15 | 15 |
| $Al_2O_3$ | 6.0 | 3.0 | 5.0 | 4.0 | 3.5 |
| $Li_2O$ | 5.5 | 6.6 | 5.5 | 6.0 | 6.5 |
| $Na_2O$ | 4 | 2 | 3 | 4 | 3 |
| $K_2O$ | | | | | |
| MgO | | | | | |
| CaO | | | | | |
| BaO | 23.5 | 27.0 | 26.0 | 24.0 | 25.0 |
| SrO | 0.1 | 1.0 | 0.3 | 0.7 | 0.5 |
| ZnO | 4.5 | 2.0 | 2.5 | 3.5 | 3.0 |
| $TiO_2$ | 0.3 | 0.1 | 0.5 | 0.5 | 0.3 |
| $ZrO_2$ | | | | | |
| $Sb_2O_3$ | 0.1 | 0.3 | 0.2 | 0.3 | 0.2 |
| Sum | 100.0 | 100.0 | 100.0 | 100.0 | 100.0 |
| $n_d$ [7 K/h] | 1.5862 | 1.5889 | 1.5885 | 1.5871 | 1.5874 |
| $v_d$ [7 K/h] | 58.13 | 59.91 | 59.24 | 58.74 | 59.42 |
| $P_{g,F}$ [7 K/h] | 0.5440 | 0.5412 | 0.5416 | 0.5426 | 0.5412 |
| $\Delta P_{g,F} (10^{-4})$ [7 K/h] | −21 | −19 | −25 | −24 | −27 |
| $\tau_{i\ 420\ nm;\ 25\ mm}$ | 99.4 | 99.4 | 99.3 | 99.2 | 99.7 |
| $\tau_{i\ 400\ nm;\ 25\ mm}$ | 99.2 | 99.1 | 99.0 | 98.7 | 99.5 |
| $\tau_{i\ 380\ nm;\ 25\ mm}$ | 98.3 | 98.4 | 98.0 | 97.4 | 98.8 |
| $\tau_{i\ 360\ nm;\ 25\ mm}$ | 94.8 | 96.2 | 94.1 | 92.6 | 96.2 |
| $\alpha_{20-300} (10^{-6} * K^{-1})$ | 8.9 | 9.0 | 8.8 | 9.2 | 9.1 |
| Tg (° C.) | 484 | 497 | 499 | 490 | 486 |
| $\rho$ (g/cm$^3$) | 3.00 | 3.04 | 3.04 | 3.01 | 3.01 |

(continued, Examples 6-10, melting examples (in wt %))

| | Example | | | | |
|---|---|---|---|---|---|
| | 6 | 7 | 8 | 9 | 10 |
| $SiO_2$ | 37 | 46 | 39 | 42 | 43 |
| $B_2O_3$ | 16 | 12 | 18 | 15 | 15 |
| $Al_2O_3$ | 6.0 | 3.0 | 7.0 | 1.0 | 3.5 |
| $Li_2O$ | 5.0 | 5.6 | 5.5 | 6.0 | 6.5 |
| $Na_2O$ | 4.5 | 1 | 1 | 5 | 3 |
| $K_2O$ | 3 | | | | |
| MgO | 2 | | | 3 | |
| CaO | | | 3 | 1 | |
| BaO | 21 | 29 | 23 | 22 | 25 |
| SrO | 0.1 | 1.0 | 0.3 | 0.7 | 1.5 |
| ZnO | 4.5 | 2.0 | 2.5 | 3.5 | 2.0 |
| $TiO_2$ | 0.3 | 0.1 | 0.1 | 0.5 | 0.3 |
| $ZrO_2$ | 0.5 | | 0.4 | | |
| $Sb_2O_3$ | 0.1 | 0.3 | 0.2 | 0.3 | 0.2 |
| Sum | 100.0 | 100.0 | 100.0 | 100.0 | 100.0 |
| $n_d$ [7 K/h] | 1.5932 | 1.5871 | 1.5916 | 1.5938 | 1.586 |
| $v_d$ [7 K/h] | 57.05 | 59.44 | 59.35 | 58.07 | 59.33 |
| $P_{g,F}$ [7 K/h] | 0.5462 | 0.5382 | 0.5402 | 0.5402 | 0.5402 |
| $\Delta P_{g,F} (10^{-4})$ [7 K/h] | −26 | −19 | −22 | −19 | −21 |
| $\tau_{i\ 420\ nm;\ 25\ mm}$ | 99.8 | 99.6 | 99.4 | 99.1 | 99.5 |
| $\tau_{i\ 400\ nm;\ 25\ mm}$ | 99.6 | 99.4 | 99.0 | 98.5 | 99.2 |
| $\tau_{i\ 380\ nm;\ 25\ mm}$ | 98.9 | 98.6 | 98.3 | 97.3 | 98.7 |
| $\tau_{i\ 360\ nm;\ 25\ mm}$ | 96.4 | 96.3 | 96.0 | 92.1 | 96.0 |
| $\alpha_{20-300} (10^{-6} * K^{-1})$ | 9.8 | 8.6 | 8.2 | 9.9 | 9.2 |
| Tg (° C.) | 470 | 520 | 518 | 474 | 493 |
| $\rho$ (g/cm$^3$) | 3.05 | 3.06 | 3.01 | 2.99 | 2.99 |

The table shows, that the glasses according to the present invention show excellent properties with regard on the optical range, the viscosity-temperature profiles and the processing temperatures. Thus, highly specific hot forming close to the final geometry can be guaranteed also with sensitive precision machines. In addition, a correlation of the stability against crystallization and the viscosity-temperature profile was realised, so that also further thermal treatment (pressing or re-pressing) of the glasses is easily possible.

The invention claimed is:
1. A lead-free and arsenic-free glass with good chemical durability and stability against crystallization, which has a refractive index of $1.57 \leq n_d \leq 1.61$, an Abbe number of $56 \leq \upsilon_d \leq 63$, and a transformation temperature Tg≤520° C., said lead-free and arsenic-free glass consisting, in wt % based on oxide content, of:

| | | | |
|---|---|---|---|
| $SiO_2$ | 37 | — | 46 |
| $B_2O_3$ | 12 | — | 18 |
| $Al_2O_3$ | 1 | — | 7 |
| $Li_2O$ | 5.5 | — | <7 |
| $Na_2O$ | 1 | — | 5 |
| $K_2O$ | | < | 4 |
| MgO | | < | 5 |
| CaO | | < | 7 |
| BaO | 21 | — | 29 |
| SrO | 0.1 | — | 1.5 |
| ZnO | 1 | — | 4.5 |
| $TiO_2$ | 0.1 | — | 0.5 |
| $ZrO_2$ | | < | 0.7 |
| $\Sigma TiO_2 + ZrO_2$ | | < | 0.9 |
| $Sb_2O_3$ | 0 | — | 1 |
| SnO | 0 | — | 1 |
| NaCl | 0 | — | 1 |
| $SO_4^{2-}$ | 0 | — | 1 |
| $F^-$ | 0 | — | 1. |

2. The lead-free and arsenic-free optical glass according to claim 1, said lead-free and arsenic-free optical glass consisting, in wt % based on oxide content, of:

| | | | |
|---|---|---|---|
| $SiO_2$ | 37 | — | 46 |
| $B_2O_3$ | 12 | — | 18 |
| $Al_2O_3$ | 1 | — | 7 |
| $\Sigma SiO_2 + Al_2O_3$ | | ≦ | 50 |
| $Li_2O$ | 5.5 | — | <7 |
| $Na_2O$ | 1 | — | 5 |
| $K_2O$ | | < | 3 |
| $M_2O$ | | < | 12 |
| MgO | | < | 5 |
| CaO | | < | 7 |
| BaO | 21 | — | 29 |
| SrO | 0.1 | — | 1.5 |
| ZnO | 1 | — | 4.5 |
| $\Sigma MO$ | | ≦ | 31 |
| $TiO_2$ | 0.1 | — | 0.5 |
| $ZrO_2$ | | < | 0.7 |
| $\Sigma TiO_2 + ZrO_2$ | | < | 0.9 |
| $Sb_2O_3$ | 0 | — | 1 |
| SnO | 0 | — | 1 |
| NaCl | 0 | — | 1 |
| $SO_4^{2-}$ | 0 | — | 1 |
| F- | 0 | — | 1. |

3. The lead-free and arsenic-free optical glass according to claim 1, said lead-free and arsenic-free optical glass consisting, in wt % based on oxide content, of:

| | | | |
|---|---|---|---|
| $SiO_2$ | 40 | — | 44 |
| $B_2O_3$ | 14 | — | 16 |
| $Al_2O_3$ | 3 | — | 6 |
| $Li_2O$ | 5.5 | — | <7 |
| $Na_2O$ | 2 | — | 4 |
| BaO | 23 | — | 27 |
| SrO | 0.1 | — | 1 |
| ZnO | 2 | — | 4.5 |
| $TiO_2$ | 0.1 | — | 0.5 |
| $Sb_2O_3$ | 0 | — | 1 |
| SnO | 0 | — | 1 |
| NaCl | 0 | — | 1 |
| $SO_4^{2-}$ | 0 | — | 1 |
| $F^-$ | 0 | — | 1, | wherein said refractive index $n_d$ is greater than 1.58 but less than 1.60, said Abbe number $\upsilon_d$ is greater than 57 but less than 62, and said transformation temperature Tg is less than or equal to 510° C.

4. The lead-free and arsenic-free optical glass according to claim 1, said lead-free and arsenic-free optical glass consisting, in wt % based on oxide content, of:

| | | | |
|---|---|---|---|
| $SiO_2$ | 41 | — | 43 |
| $B_2O_3$ | 14 | — | 16 |
| $Al_2O_3$ | 3.5 | — | 6 |
| $Li_2O$ | 5.5 | — | 6.5 |
| $Na_2O$ | 2 | — | 4 |
| BaO | 23 | — | 27 |
| SrO | 0.3 | — | 1 |
| ZnO | 2.5 | — | 4 |
| $TiO_2$ | 0.1 | — | 0.5 |
| $Sb_2O_3$ | 0 | — | 1 |
| SnO | 0 | — | 1 |
| NaCl | 0 | — | 1 |
| $SO_4^{2-}$ | 0 | — | 1 |
| $F^-$ | 0 | — | 1, | wherein said refractive index $n_d$ is greater than or equal to 1.585 but less than or equal to 1.590, said Abbe number is greater than or equal to 58 but less than or equal to 61, and said transformation temperature Tg is less than or equal to 500° C.

\* \* \* \* \*